United States Patent
Kumar et al.

(10) Patent No.: US 8,667,439 B1
(45) Date of Patent: Mar. 4, 2014

(54) AUTOMATICALLY CONNECTING SOCS IP CORES TO INTERCONNECT NODES TO MINIMIZE GLOBAL LATENCY AND REDUCE INTERCONNECT COST

(71) Applicant: NetSpeed Systems, San Jose, CA (US)

(72) Inventors: Sailesh Kumar, San Jose, CA (US); Eric Norige, East Lansing, MI (US)

(73) Assignee: NetSpeed Systems, San Jose, CA (US)

( * ) Notice: Subject to any disclaimer, the term of this patent is extended or adjusted under 35 U.S.C. 154(b) by 0 days.

(21) Appl. No.: 13/961,809

(22) Filed: Aug. 7, 2013

Related U.S. Application Data

(63) Continuation of application No. 13/779,618, filed on Feb. 27, 2013, now abandoned.

(51) Int. Cl.
*G06F 17/50* (2006.01)

(52) U.S. Cl.
USPC ........... 716/108; 716/106; 716/118; 716/119; 716/134

(58) Field of Classification Search
USPC ................ 716/106, 108, 118, 119, 134
See application file for complete search history.

(56) References Cited

U.S. PATENT DOCUMENTS

| | | | | |
|---|---|---|---|---|
| 8,059,551 B2* | 11/2011 | Milliken | | 370/252 |
| 8,099,757 B2* | 1/2012 | Riedl et al. | | 725/116 |
| 2008/0120129 A1* | 5/2008 | Seubert et al. | | 705/1 |

* cited by examiner

*Primary Examiner* — Sun Lin
(74) *Attorney, Agent, or Firm* — Procopio, Cory, Hargreaves & Savitch LLP

(57) ABSTRACT

Systems and methods described herein are directed to solutions for Network on Chip (NoC) interconnects that automatically and dynamically determines the position of various hosts in a NoC topology based on the connectivity, bandwidth and latency requirements of the system traffic flows and certain performance optimization metrics such as system interconnect latency and interconnect cost. The example implementations selects hosts for relocation consideration and determines a new possible position for them in the NoC based on the system traffic specification, and using probabilistic functions to decide if the relocation is carried out or not. The procedure is repeated over new sets of hosts until certain optimization targets are satisfied or repetition count is exceeded.

21 Claims, 15 Drawing Sheets

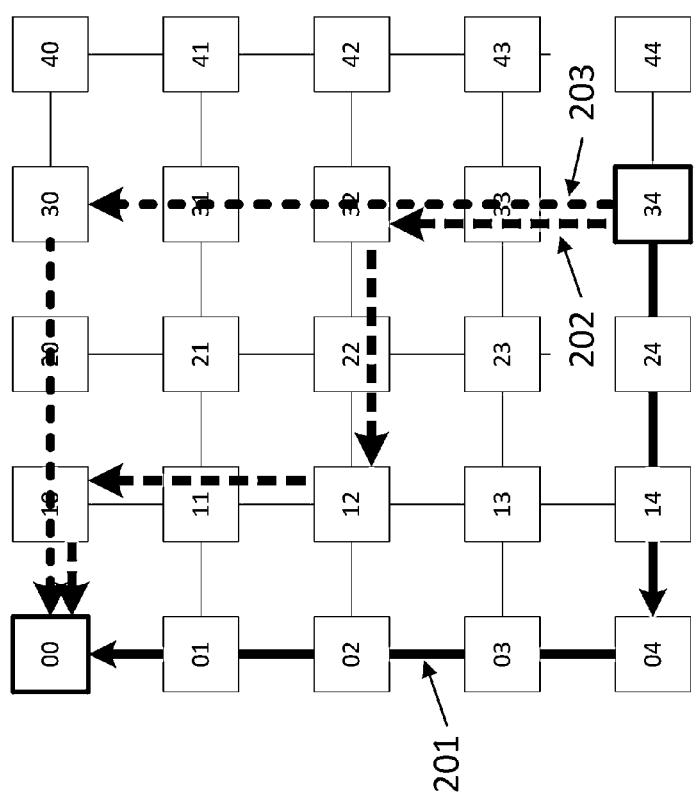

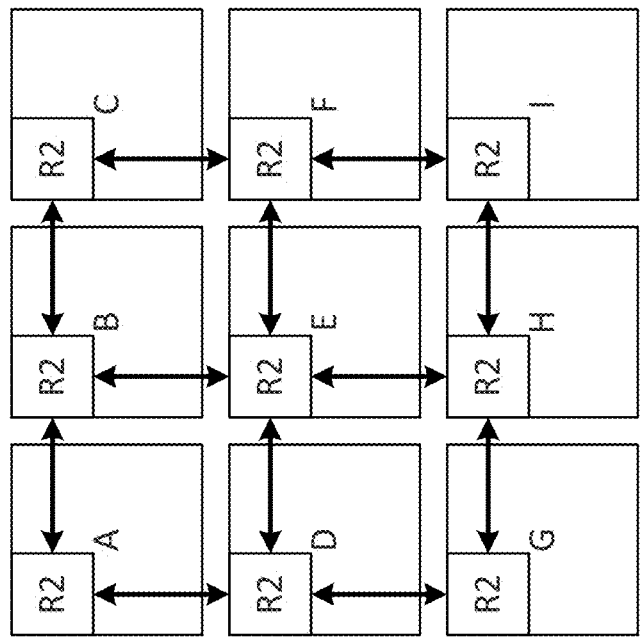
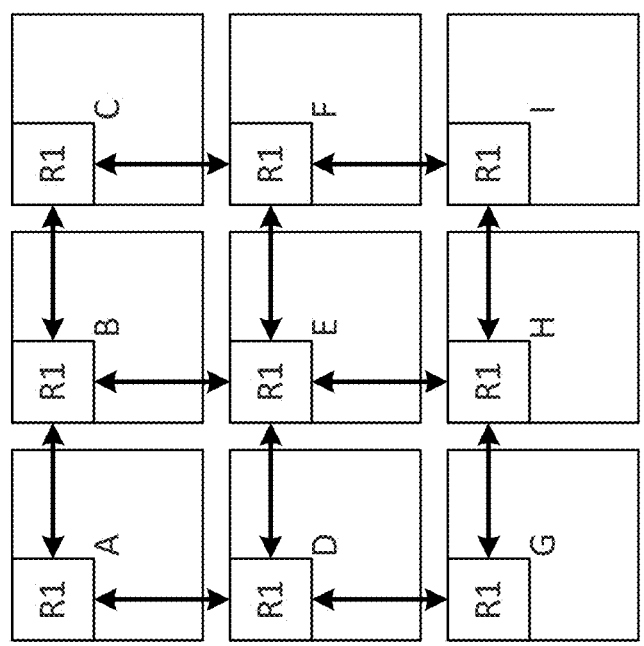
FIG. 3(a)

AUTOMATICALLY CONNECTING SOCS IP CORES TO INTERCONNECT NODES TO MINIMIZE GLOBAL LATENCY AND REDUCE INTERCONNECT COST

CROSS-REFERENCE TO RELATED APPLICATION(S)

This application claims the benefit of U.S. application Ser. No. 13/779,618, filed Feb. 27, 2013, the disclosure of which is hereby incorporated by reference.

BACKGROUND

1. Technical Field

Methods and example implementations described herein are directed to interconnect architecture, and more specifically, to automatically connect System-on-Chip Intellectual Property (SoC IP) cores to Network on Chip (NoC) nodes in a NoC system interconnect architecture.

2. Related Art

The number of components on a chip is rapidly growing due to increasing levels of integration, system complexity and shrinking transistor geometry. Complex System-on-Chips (SoCs) may involve a variety of components e.g., processor cores, DSPs, hardware accelerators, memory and I/O, while Chip Multi-Processors (CMPs) may involve a large number of homogenous processor cores, memory and I/O subsystems. In both SoC and CMP systems, the on-chip interconnect plays a role in providing high-performance communication between the various components. Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links.

Messages are injected by the source and are routed from the source node to the destination over multiple intermediate nodes and physical links. The destination node then ejects the message and provides the message to the destination. For the remainder of this application, the terms 'components', 'blocks', 'hosts' or 'cores' will be used interchangeably to refer to the various system components which are interconnected using a NoC. Terms 'routers' and 'nodes' will also be used interchangeably. Without loss of generality, the system with multiple interconnected components will itself be referred to as a 'multi-core system'.

There are several topologies in which the routers can connect to one another to create the system network. Bi-directional rings (as shown in FIG. 1(a)), 2-D (two dimensional) mesh (as shown in FIG. 1(b)) and 2-D Taurus (as shown in FIG. 1(c)) are examples of topologies in the related art. Mesh and Taurus can also be extended to 2.5-D (two and half dimensional) or 3-D (three dimensional) organizations. FIG. 1(d) shows a 3D mesh NoC, where there are three layers of 3×3 2D mesh NoC shown over each other. The NoC routers have up to two additional ports, one connecting to a router in the higher layer, and another connecting to a router in the lower layer. Router 111 in the middle layer of the example has both ports used, one connecting to the router at the top layer and another connecting to the router at the bottom layer. Routers 110 and 112 are at the bottom and top mesh layers respectively, therefore they have only the upper facing port 113 and the lower facing port 114 respectively connected.

Packets are message transport units for intercommunication between various components. Routing involves identifying a path composed of a set of routers and physical links of the network over which packets are sent from a source to a destination. Components are connected to one or multiple ports of one or multiple routers; with each such port having a unique ID. Packets carry the destination's router and port ID for use by the intermediate routers to route the packet to the destination component.

Examples of routing techniques include deterministic routing, which involves choosing the same path from A to B for every packet. This form of routing is independent from the state of the network and does not load balance across path diversities, which might exist in the underlying network. However, such deterministic routing may implemented in hardware, maintains packet ordering and may be rendered free of network level deadlocks. Shortest path routing may minimize the latency as such routing reduces the number of hops from the source to the destination. For this reason, the shortest path may also be the lowest power path for communication between the two components. Dimension-order routing is a form of deterministic shortest path routing in 2-D, 2.5-D, and 3-D mesh networks. In this routing scheme, messages are routed along each coordinates in a particular sequence until the message reaches the final destination. For example in a 3-D mesh network, one may first route along the X dimension until it reaches a router whose X-coordinate is equal to the X-coordinate of the destination router. Next, the message takes a turn and is routed in along Y dimension and finally takes another turn and moves along the Z dimension until the message reaches the final destination router. Dimension ordered routing may be minimal turn and shortest path routing.

FIG. 2(a) pictorially illustrates an example of XY routing in a two dimensional mesh. More specifically, FIG. 2(a) illustrates XY routing from node '34' to node '00'. In the example of FIG. 2(a), each component is connected to only one port of one router. A packet is first routed over the x-axis till the packet reaches node '04' where the x-coordinate of the node is the same as the x-coordinate of the destination node. The packet is next routed over the y-axis until the packet reaches the destination node.

In heterogeneous mesh topology in which one or more routers or one or more links are absent, dimension order routing may not be feasible between certain source and destination nodes, and alternative paths may have to be taken. The alternative paths may not be shortest or minimum turn.

Source routing and routing using tables are other routing options used in NoC. Adaptive routing can dynamically change the path taken between two points on the network based on the state of the network. This form of routing may be complex to analyze and implement.

A NoC interconnect may contain multiple physical networks. Over each physical network, there may exist multiple virtual networks, wherein different message types are transmitted over different virtual networks. In this case, at each physical link or channel, there are multiple virtual channels; each virtual channel may have dedicated buffers at both end points. In any given clock cycle, only one virtual channel can transmit data on the physical channel.

NoC interconnects may employ wormhole routing, wherein, a large message or packet is broken into small pieces known as flits (also referred to as flow control digits). The first flit is the header flit, which holds information about this packet's route and key message level info along with payload data and sets up the routing behavior for all subsequent flits associated with the message. Optionally, one or more body flits follows the head flit, containing the remaining payload of data. The final flit is the tail flit, which in addition to containing the last payload also performs some bookkeeping to close the connection for the message. In wormhole flow control, virtual channels are often implemented.

The physical channels are time sliced into a number of independent logical channels called virtual channels (VCs). VCs provide multiple independent paths to route packets, however they are time-multiplexed on the physical channels. A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

The term "wormhole" plays on the way messages are transmitted over the channels: the output port at the next router can be so short that received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a worm-like image.

Based upon the traffic between various end points, and the routes and physical networks that are used for various messages, different physical channels of the NoC interconnect may experience different levels of load and congestion. The capacity of various physical channels of a NoC interconnect is determined by the width of the channel (number of physical wires) and the clock frequency at which it is operating. Various channels of the NoC may operate at different clock frequencies, and various channels may have different widths based on the bandwidth requirement at the channel. The bandwidth requirement at a channel is determined by the flows that traverse over the channel and their bandwidth values. Flows traversing over various NoC channels are affected by the routes taken by various flows. In a mesh or Taurus NoC, there may exist multiple route paths of equal length or number of hops between any pair of source and destination nodes. For example, in FIG. 2(b), in addition to the standard XY route between nodes 34 and 00, there are additional routes available, such as YX route 203 or a multi-turn route 202 that makes more than one turn from source to destination.

In a NoC with statically allocated routes for various traffic slows, the load at various channels may be controlled by intelligently selecting the routes for various flows. When a large number of traffic flows and substantial path diversity is present, routes can be chosen such that the load on all NoC channels is balanced nearly uniformly, thus avoiding a single point of bottleneck. Once routed, the NoC channel widths can be determined based on the bandwidth demands of flows on the channels. Unfortunately, channel widths cannot be arbitrarily large due to physical hardware design restrictions, such as timing or wiring congestion. There may be a limit on the maximum channel width, thereby putting a limit on the maximum bandwidth of any single NoC channel.

Additionally, wider physical channels may not help in achieving higher bandwidth if messages are short. For example, if a packet is a single flit packet with a 64-bit width, then no matter how wide a channel is, the channel will only be able to carry 64 bits per cycle of data if all packets over the channel are similar. Thus, a channel width is also limited by the message size in the NoC. Due to these limitations on the maximum NoC channel width, a channel may not have enough bandwidth in spite of balancing the routes.

To address the above bandwidth concern, multiple parallel physical NoCs may be used. Each NoC may be called a layer, thus creating a multi-layer NoC architecture. Hosts inject a message on a NoC layer; the message is then routed to the destination on the NoC layer, where it is delivered from the NoC layer to the host. Thus, each layer operates more or less independently from each other, and interactions between layers may only occur during the injection and ejection times. FIG. 3(a) illustrates a two layer NoC. Here the two NoC layers are shown adjacent to each other on the left and right, with the hosts connected to the NoC replicated in both left and right diagrams. A host is connected to two routers in this example—a router in the first layer shown as R1, and a router is the second layer shown as R2. In this example, the multi-layer NoC is different from the 3D NoC, i.e. multiple layers are on a single silicon die and are used to meet the high bandwidth demands of the communication between hosts on the same silicon die. Messages do not go from one layer to another. For purposes of clarity, the present application will utilize such a horizontal left and right illustration for multi-layer NoC to differentiate from the 3D NoCs, which are illustrated by drawing the NoCs vertically over each other.

In FIG. 3(b), a host connected to a router from each layer, R1 and R2 respectively, is illustrated. Each router is connected to other routers in its layer using directional ports 301, and is connected to the host using injection and ejection ports 302. A bridge-logic 303 may sit between the host and the two NoC layers to determine the NoC layer for an outgoing message and sends the message from host to the NoC layer, and also perform the arbitration and multiplexing between incoming messages from the two NoC layers and delivers them to the host.

In a multi-layer NoC, the number of layers needed may depend upon a number of factors such as the aggregate bandwidth requirement of all traffic flows in the system, the routes that are used by various flows, message size distribution, maximum channel width, etc. Once the number of NoC layers in NoC interconnect is determined in a design, different messages and traffic flows may be routed over different NoC layers. Additionally, one may design NoC interconnects such that different layers have different topologies in number of routers, channels and connectivity. The channels in different layers may have different widths based on the flows that traverse over the channel and their bandwidth requirements.

In a NoC interconnect, if the traffic profile is not uniform and there is a certain amount of heterogeneity (e.g., certain hosts talking to each other more frequently than the others), the interconnect performance may depend on the NoC topology and where various hosts are placed in the topology with respect to each other and to what routers they are connected to. For example, if two hosts talk to each other frequently and require higher bandwidth than other interconnects, then they should be placed next to each other. This will reduce the latency for this communication which thereby reduces the global average latency, as well as reduce the number of router nodes and links over which the higher bandwidth of this communication must be provisioned.

Moving two hosts closer together may make certain other hosts far apart since all hosts must fit into the 2D planar NoC topology without overlapping with each other. Thus, various tradeoffs must be made and the hosts must be placed after examining the pair-wise bandwidth and latency requirements between all hosts so that certain global cost and performance metrics is optimized. The cost and performance metrics can be, for example, average structural latency between all communicating hosts in number of router hops, or sum of bandwidth between all pair of hosts and the distance between them in number of hops, or some combination of these two. This optimization problem is known to be NP-hard and heuristic based approaches are often used. The hosts in a system may vary in shape and sizes with respect to each other, which puts additional complexity in placing them in a 2D planar NoC topology, packing them optimally while leaving little whitespaces, and avoiding overlapping hosts.

SUMMARY

Aspects of the present application include a method, which may involve automatically determining positions for various hosts or IP cores in a mesh or Taurus network on chip (NoC) interconnect and connecting the host's ports to various NoC routers so that the overall system performance in form of certain efficiency functions is optimized; determining efficiency function in terms of latency, bandwidth and distance in number of router hops between all communicating hosts in the NoC; ensuring that the resulting positions of hosts does not result in two hosts spatially overlapping with each other and minimizes the whitespace between hosts of different shapes and sizes; ensuring that all host's ports can be connected to the available NoC routers; ensuring that the resulting positions of the hosts does not affect the connectivity needed by all hosts in the NoC; and automatically configuring the NoC routers and paths based on the host positions.

Aspects of the present application include a system, which may involve automatically determining positions for various hosts or IP cores in a mesh or Taurus network on chip (NoC) interconnect and connecting the host's ports to various NoC routers so that the overall system performance in form of certain efficiency functions is optimized; determining efficiency function in terms of latency, bandwidth and distance in number of router hops between all communicating hosts in the NoC; ensuring that the resulting positions of hosts does not result in two hosts spatially overlapping with each other and minimizes the whitespace between hosts of different shapes and sizes; ensuring that all host's ports can be connected to the available NoC routers; ensuring that the resulting positions of the hosts does not affect the connectivity needed by all hosts in the NoC; and automatically configuring the NoC routers and paths based on the host positions.

BRIEF DESCRIPTION OF THE DRAWINGS

FIG. 2(b) illustrates three different routes between a source and destination nodes.

FIG. 3(a) illustrates an example of a related art two layer NoC interconnect.

DETAILED DESCRIPTION

Figure 1A:
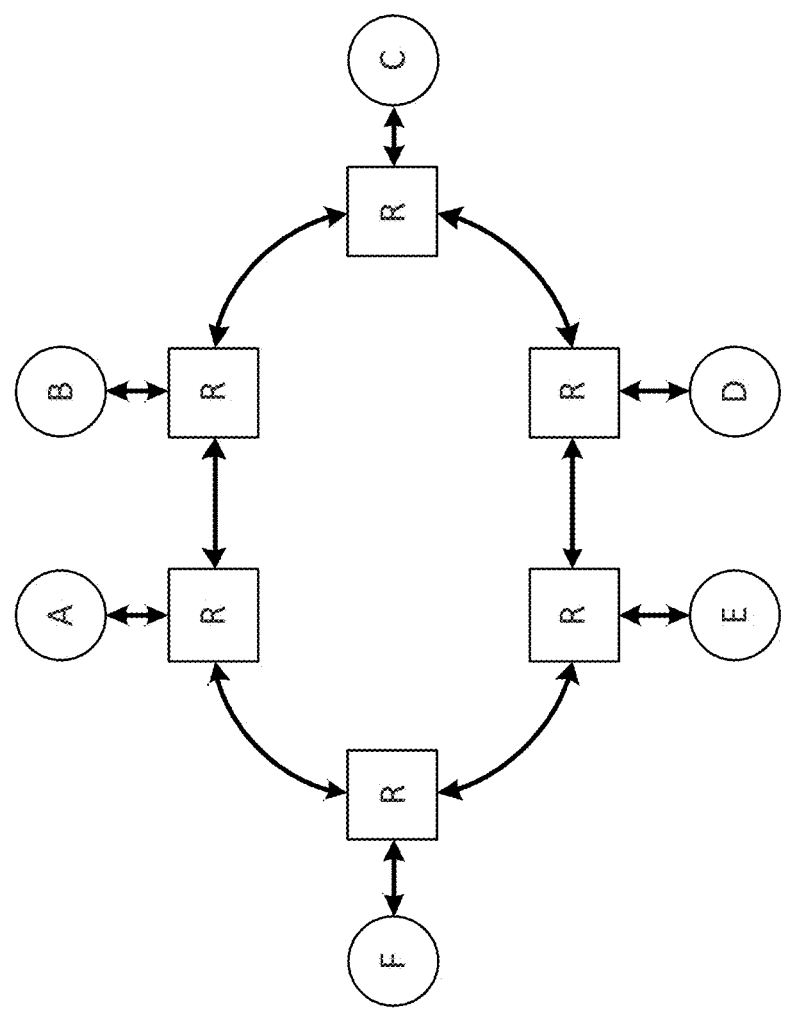
FIGS. 1(a), 1(b) 1(c) and 1(d) illustrate examples of Bidirectional ring, 2D Mesh, 2D Taurus, and 3D Mesh NoC Topologies.
Figure 1B:
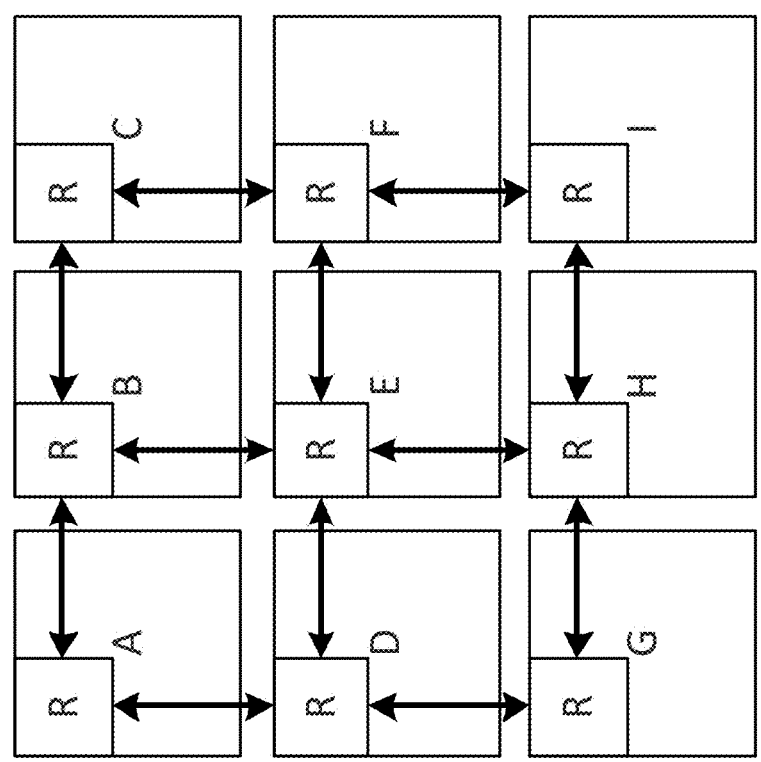
Figure 1C:
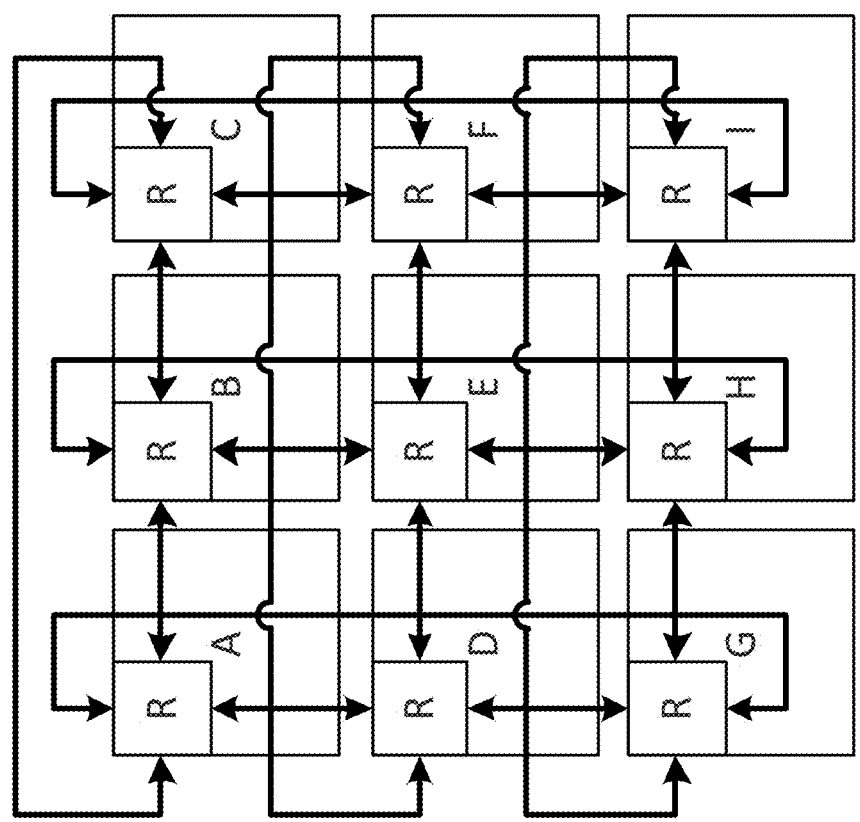
Figure 1D:
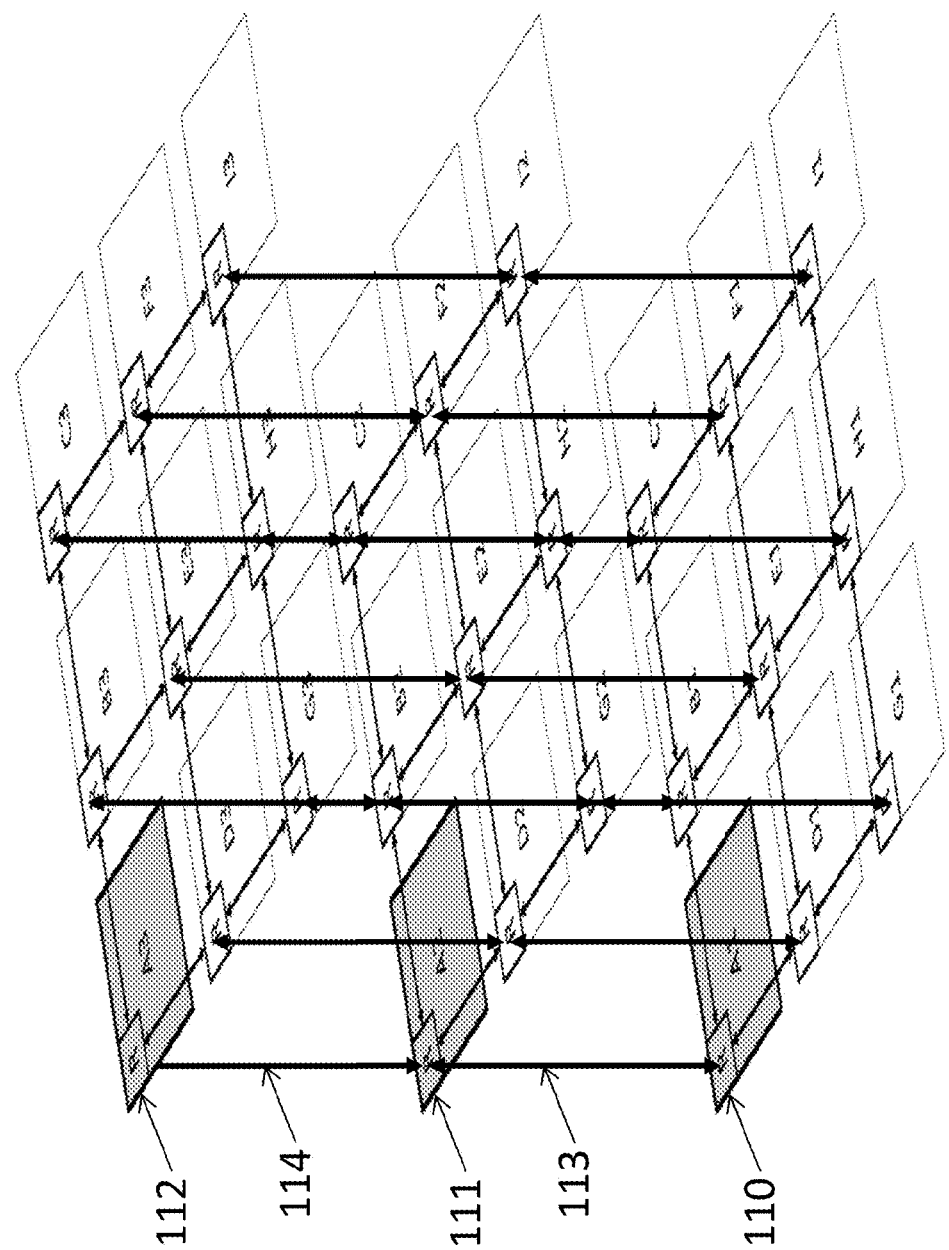
Figure 2A:
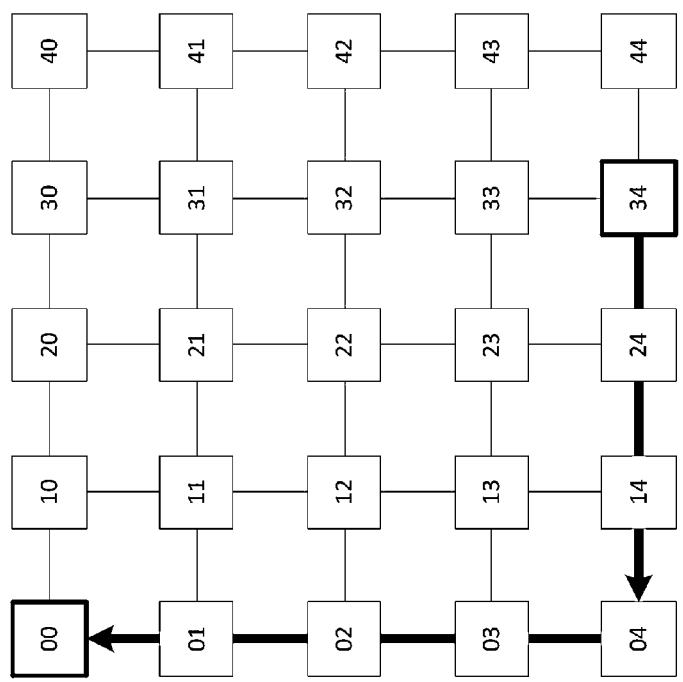
FIG. 2(a) illustrates an example of XY routing in a related art two dimensional mesh.
Figure 3B:
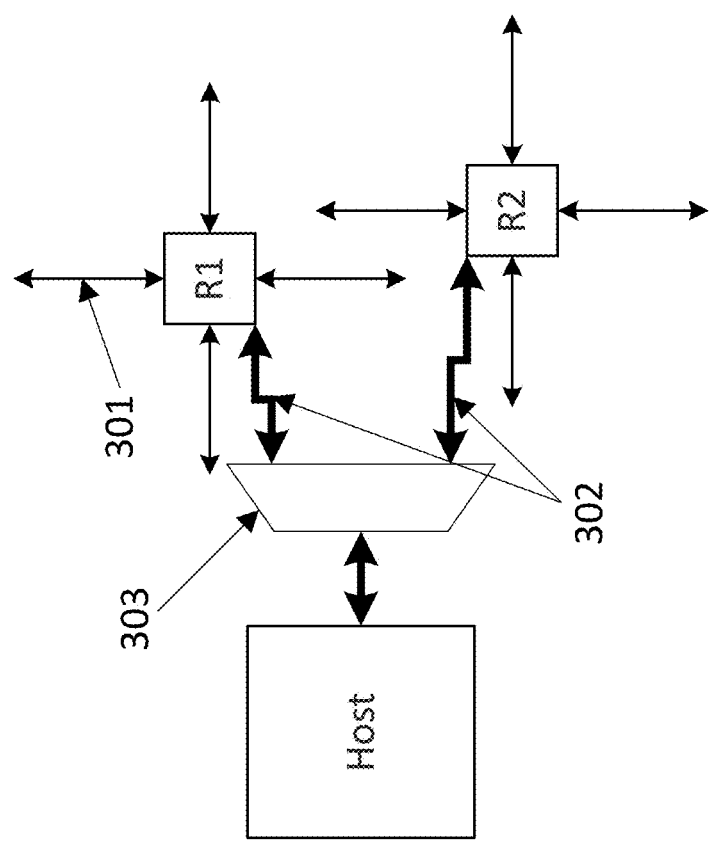
FIG. 3(b) illustrates the related art bridge logic between host and multiple NoC layers.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

In a distributed NoC interconnect connecting various components of a system on a chip with each other using multiple routers and point to point links between the routers, there is a need to determine an appropriate position for various hosts in the NoC topology and connect them to the local router at the position. For example, if two hosts communicate with each other frequently and require higher bandwidth than other interconnects, it may be better to place them closer to each other so that the transactions between these hosts can go over fewer router hops and links and the overall latency and the NoC cost can be reduced.

Assuming that two hosts with certain shapes and sizes cannot spatially overlap with each other on a 2D SoC plane, tradeoffs may need to be made. Moving certain hosts closer to improve inter-communication between them, may force certain other hosts to be further apart, thereby penalizing inter-communication between those other hosts. To make tradeoffs that improve system performance, certain system performance metrics, such as the average global communication latency, may be used as an objective function to optimize as hosts are placed in a NoC topology. Determining substantially optimal host positions that maximizes the system performance metric may involve analyzing the connectivity and inter-communication properties between all hosts and judiciously placing them onto the 2D NoC topology.

Figure 4A:
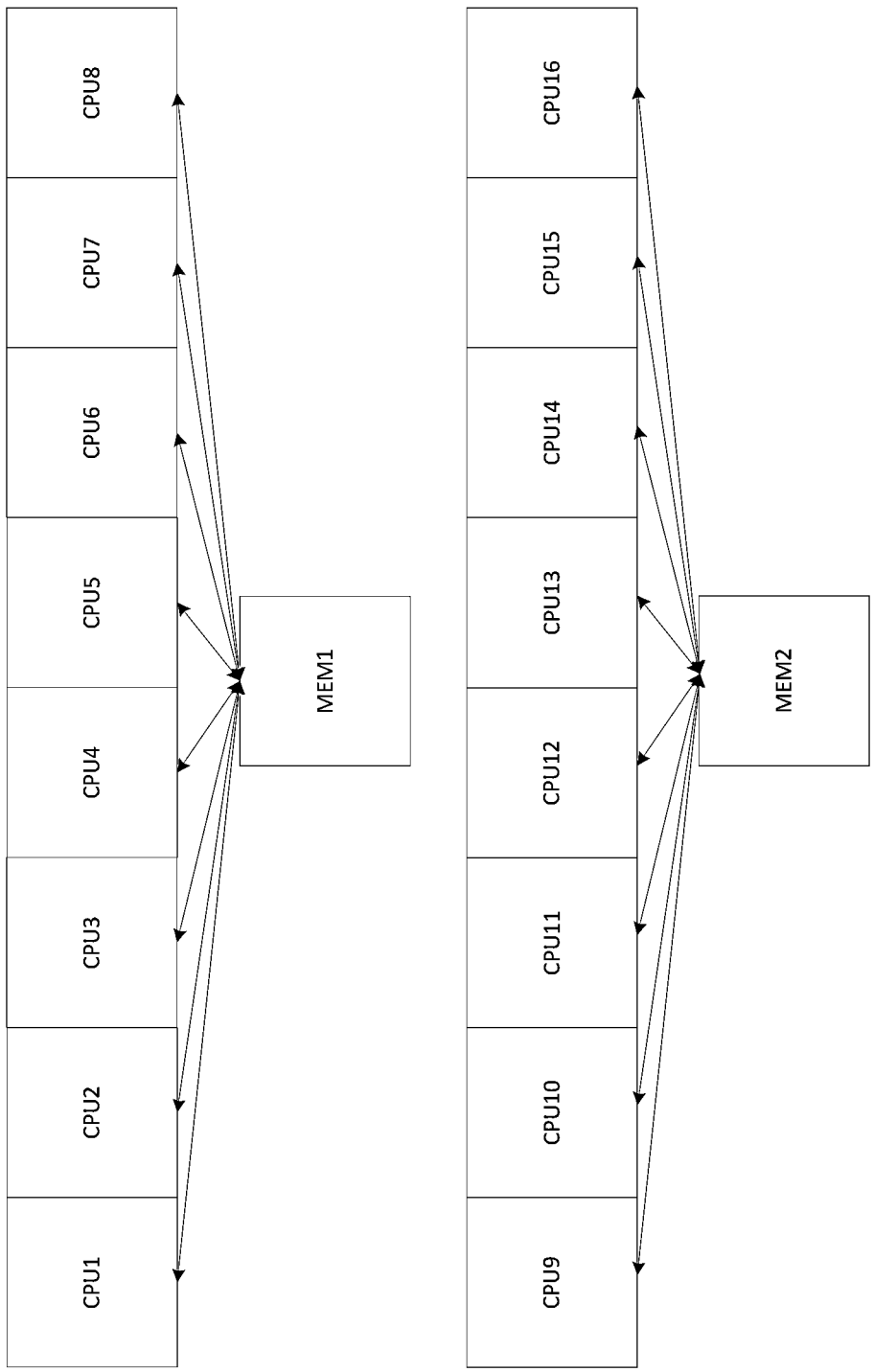
FIG. 4(a) illustrates number of system components and the connectivity between them.
Figure 4B:
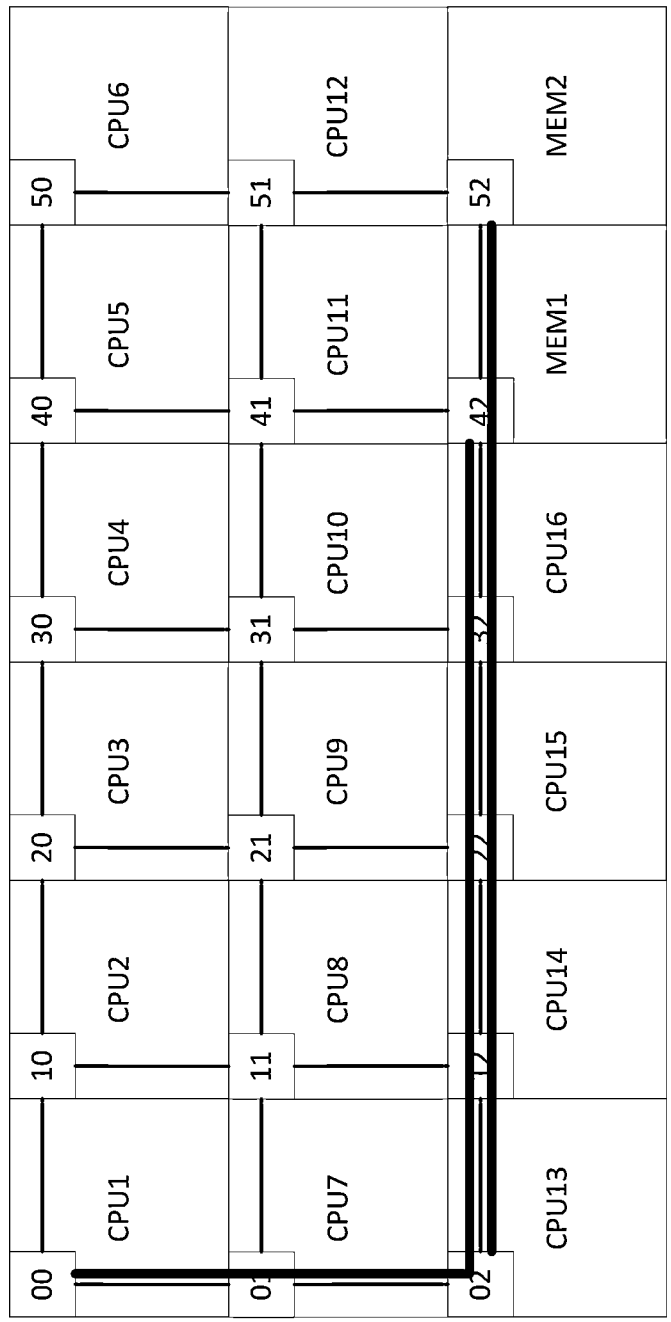
FIG. 4(b) illustrates a sample position of various hosts in a 3×6 mesh NoC topology.

Consider an example wherein there are 16 CPUs and 2 memories that need to be placed in a 3×6 mesh organization. Let the first set of 8 CPUs communicate with the first memory MEM1 and the second set of 8 CPUs communicate with the second memory MEM2 as illustrated in FIG. 4(a). The CPUs and memories may be placed in a 3×6 mesh in sequential order as shown in FIG. 4(b); each host occupies a cell in the mesh and is directly connected to the router of the cell, without consideration of the traffic between various hosts. The inter-communicating hosts are placed far from each other which lead to high average and peak structural latencies in number of hops. For instance, messages between hosts CPU1 and MEM1 need to go over 7 router nodes; message between hosts CPU13 and MEM2 needs to travel 6 hops as illustrated in the figure. Such long paths not only increases latency but also adversely affects the interconnect bandwidth, as messages stay in the NoC for longer periods and consumes bandwidth of a large number of links.

Figure 4C:
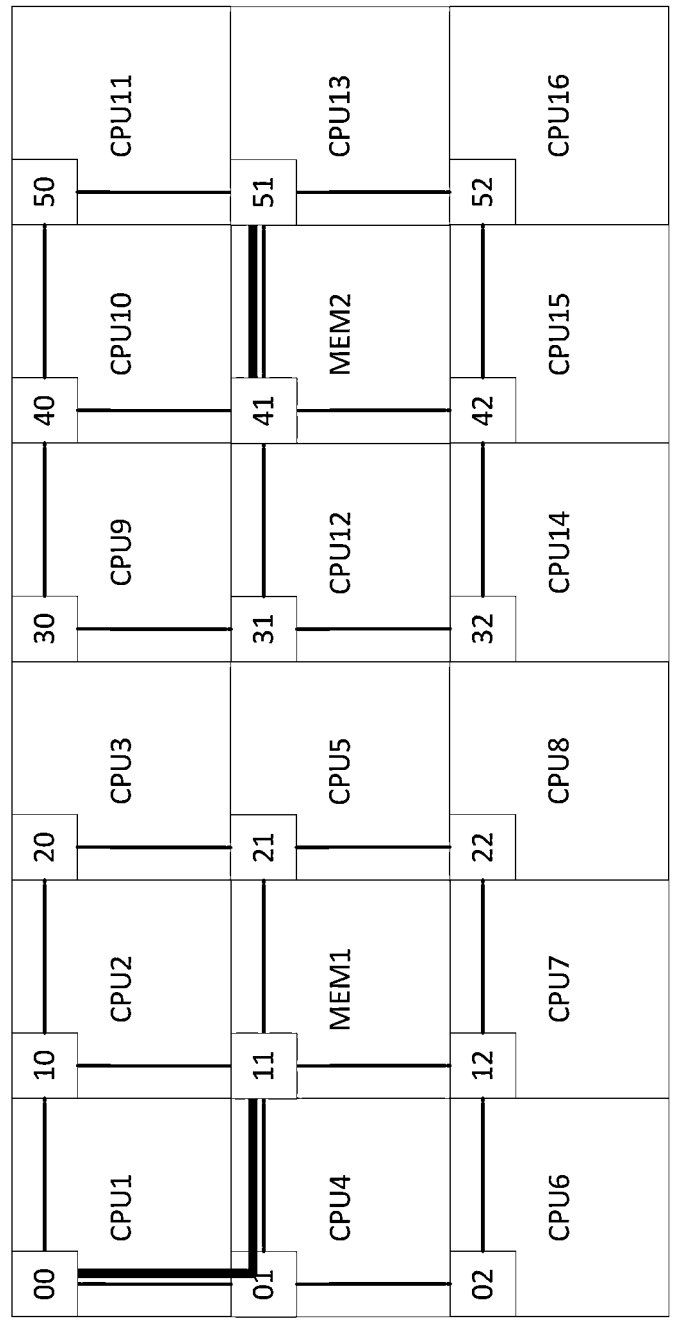
FIG. 4(c) illustrates a better position of various hosts in a 3×6 mesh NoC topology.

One may place the above set of hosts in an organization as shown in FIG. 4(c), which will significantly reduce the average and peak structural latency values. As shown, the maximum structural latency in this organization between inter-communicating hosts is 3 router hops, and a large fraction of inter-communicating hosts are only 2 router hops apart. The host positions in FIG. 4(c) can be achieved from FIG. 4(b) by repeatedly relocating certain hosts from their previous positions to new positions and in process swapping them with the hosts already present at the new positions. While it is relatively intuitive in this example to come up with optimal host positions, if the traffic profile consists of complex connectivity and highly asymmetric bandwidth and latency specifications between various hosts, then determining optimal positions for the hosts in a NoC topology may be much more difficult. In fact, it may be reduced to a known NP-hard problem. Thus, heuristic approaches must be used to determine optimal host positions in such settings. The example implementations described herein describe a number of optimization heuristic algorithms to place various hosts in a NoC topology in order to optimize certain system performance metrics.

In the proposed heuristic, the connectivity between all hosts, the bandwidth and latency requirements, and their shapes and sizes are analyzed at a global level in order to determine the host positions. Example implementations described herein are directed to solutions for 2-D, 2.5-D and 3-D NoC interconnects for automatic computation of the position of various hosts in a NoC topology based on their shapes and sizes and inter-communication properties in order to improve the system NoC interconnect performance and reduce the NoC cost. The example implementations involve: 1) devising a cost function based on the host positions in the NoC topology, routes taken by various transactions, the hosts inter-communication bandwidth and latency specification, and the desired performance metrics; 2) placing the hosts at the initial positions, connecting them to the local NoC routers, computing the routes for all transactions, and computing the initial cost function; 3) selecting a host h1 at current position p1 and determining a new possible position p2 for the host in the NoC; 4) determining how relocating host h1 to position p2, i.e. swapping it with the current set of hosts at p2, may affect the cost function; 5) deciding whether to accept or reject the above relocation; and 6) finally repeating the steps 3, 4, and 5 until certain criterion is met.

Figure 5:
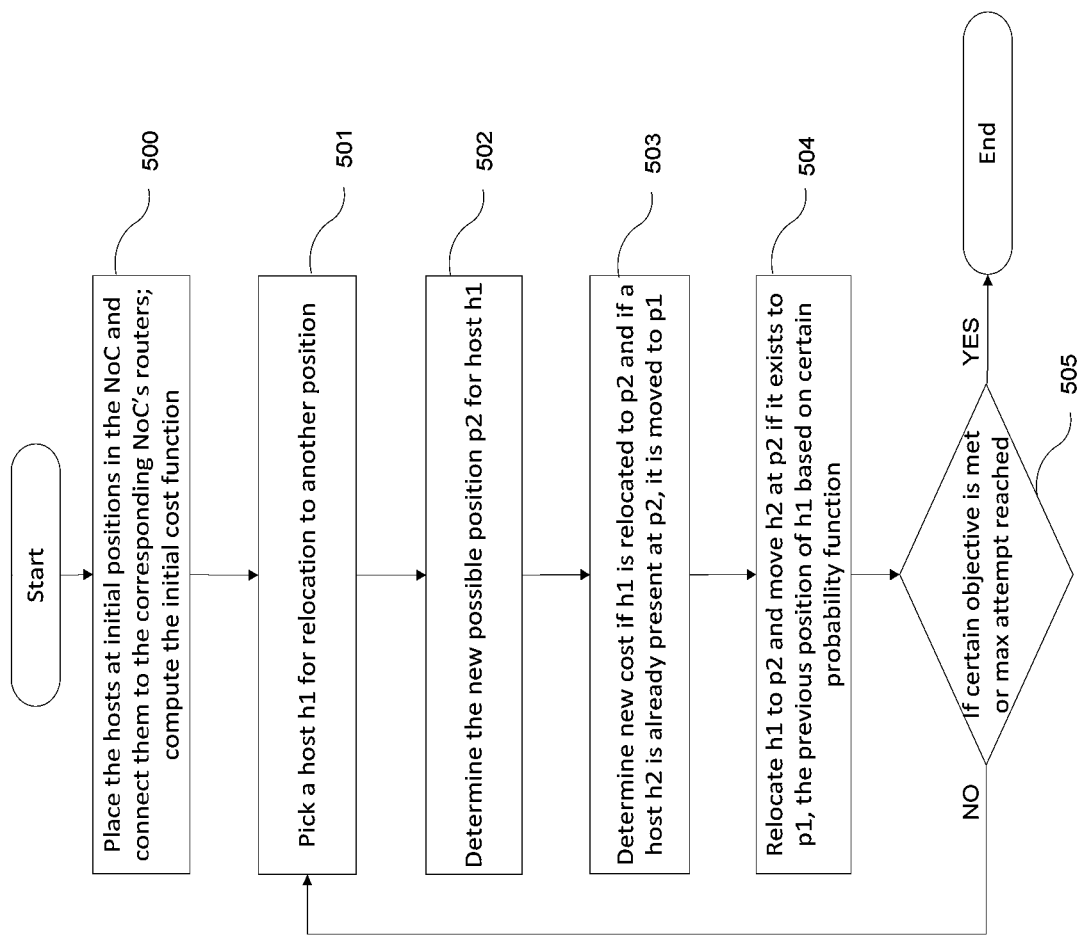
FIG. 5 illustrates the baseline algorithm to repeatedly relocate various hosts in the NoC topology in order to improve certain performance metrics.

An example implementation is described in FIG. 5. At 500, the hosts are placed at initial positions in the NoC topology and connected to the local router of the NoC. Based on the current positions, the connectivity and the inter-host communication properties, the cost function is computed. Next a host h1 at current position p1 is selected for relocation to a new position as shown at 501. A number of criteria can be used to select the host for relocation some of which are described in the additional example implementations described in later sections. At 502, a new position p2 is chosen for the host h1. If a host h2 is already present at p2 then h2 will be swapped with h1, if h1 is relocated. At 503, the new cost function is computed if h1 is relocated to p2 (and h2 to p1 if h2 exists). At 504, based on the new cost and old cost values and an acceptance function, it is decided whether h1 and h2 are relocated (swapped with each other). Finally, at 505, it is decided whether to continue at step 501 or not based on whether certain criterion are met or whether certain maximum iteration count is reached.

The maximum iteration count can be determined in many ways, depending on the desired implementation. For example, the maximum iteration count can be determined by running the process for a large number of iterations and examine when the minimum system cost found so far has become stable and no new system positions with lower cost is found after a large number of attempts. This number can be used as the maximum iteration count for the future optimizations. The maximum iteration count value of $66 \times n^3$ has generally given good results in the experiments for n×n mesh network; although higher values may be used in a high effort mode of optimization.

Another example implementation may attempt to swap a group of multiple hosts with each other. If hosts are different in shapes and sizes, then a large host may be swapped with multiple smaller hosts to make room for the larger host at the new position, and vice-versa.

The cost function may be devised in a number of ways. A simple cost function may be the sum of the product of distance between all host pairs in number of router hops and their inter-communication bandwidth requirements. This will reflect the total amount of traffic load the NoC links will experience. If hi represents the i-th host in the system, and bandwidth(hi, hj) represents the bandwidth from host hi to host hj, and distance(hi, hj) represents the distance from host hi to host hj in number of router hops, then the cost function is $$\text{cost} = \Sigma \text{bandwidth}(hi,hj) \times \text{distance}(hi,hj) \text{ for all } i,j, \text{ and } i \neq j$$

This cost function, if minimized, will minimize the bandwidth needed on the NoC channels, thereby minimizing the cost of the NoC. Since the NoC distance may also represent the structural latency, the cost function may also minimize the average global structural latency in the system. If distances and latencies are not strongly correlated in a NoC topology, alternative cost function implementations may also use latency from hi and hj as another factor in the function. If inter-communication between certain hosts is more important than the other interconnects, then a cost function implementation may use weights in the function to reflect the importance of various transactions with respect to each other.

$$\text{cost} = \Sigma \text{bandwidth}(hi,hj) \times \text{distance}(hi,hj) \times \text{weight}(hi,hj) \text{ for all } i,j, \text{ and } i \neq j$$

Several other forms of cost function may also be used based on the optimization goals.

The initial position for the hosts in the NoC topology may be chosen in a number of ways. An example implementation may randomly place the hosts so that no two hosts overlap with each other spatially and then connect the host's ports to the local router's host ports. Certain hosts may be larger than a single mesh cell, blocking certain routers and channels of the NoC, which may prevent certain routes. Hosts should be initially placed so that all inter-communicating hosts have at least one NoC route available between them, so that they can communicate with each other. During host relocation, the relocations should be restricted to those which maintain the routability of all transactions in the NoC. Another example implementation may place the hosts at initial positions that avoid any grid lock to appear, i.e. at these positions no two hosts can be swapped with each other anymore. Initial positions that allow swapping of hosts to occur freely with minimal restrictions may be preferred.

Figure 6:
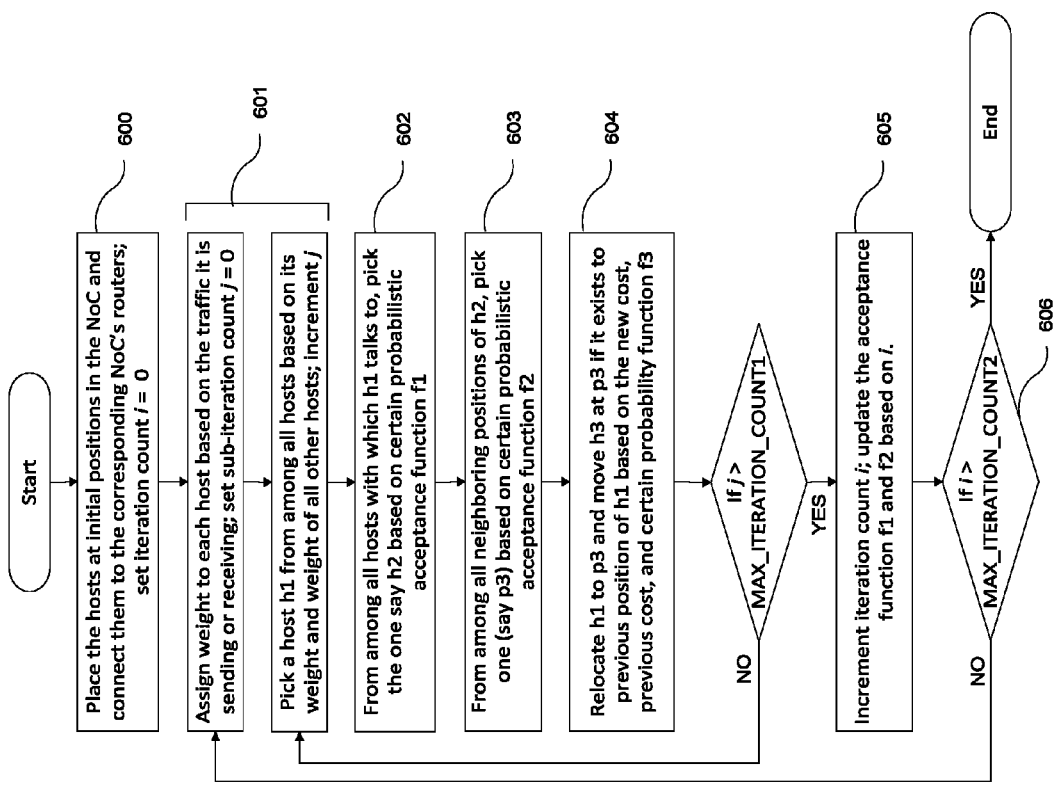
FIG. 6 illustrates a more detailed algorithm to improve the host positions.

Another example implementation may further involve choosing certain hosts for relocation or swapping more frequently than the others. Additionally, the number of times the algorithm runs may be controlled by two iteration counters, forming two loops, inner and outer. In the inner loop, hosts may be selected for relocation and a relocation may be accepted based on certain criterion in each pass; in the outer loop, at each pass, these criterion functions may be adjusted. Such design is described in FIG. 6. At 600, after putting the hosts at the initial positions, the iteration counter i of the outer loop is set at 0. At 601, the iteration counter j of the inner loop is set at 0 and based on the weights assigned to various hosts, a host h1 is selected for relocation consideration. The weight assignment to hosts for relocation consideration may depend on the latency and bandwidth specification of various hosts; e.g. one may consider those hosts that communicate with a large number of hosts more frequently for relocation than the ones which communicate with few hosts. An example weight assigned to host hi can be $$weight(hi)=bandwidth(hi)/\Sigma bandwidth(hi)$$

One may factor in the inner and outer loop iteration counters into the weights as well, to better control the host selection as the algorithm proceeds.

Next the new position of host h1 is determined. At 602, all hosts with which h1 communicates with are examined and one of them, say h2, is selected based on certain probabilistic function f1 (e.g., select host h2 x % of the time, where x is the probability indicated by the probabilistic function, etc.). Using a probabilistic function will introduce some randomness in determining the new position for a host h1, which is important to avoid local minima. Next at step 603, all neighboring positions of host h2 are examined, and one of them, say p3 is selected based on a probabilistic function f2. This is the new position for host h1. Next at step 604, a new cost function is computed if h1 is relocated to position p3, and if there was a host h3 present at position p3, then the host h3 is relocated to the current location of h1. Based on the new cost, the previous cost, and a probabilistic acceptance function f3, the relocation is either accepted or rejected based on a relocation decision (e.g., accept x % of the time, where x is the probability indicated by the probabilistic function, etc.). Next the inner and outer loop's iteration counters are updated and compared against the maximum iteration counts and the process is repeated as illustrated in the figure. During each pass of the outer loop, at step 605, the functions f1, f2 and the acceptance function f3 may be adjusted.

Function f1 may be devised such that the function gives preference to those nodes with which h1 communicates with more frequently. If host h1 talking to n hosts named h1_1 to h1_n, and the communication bandwidth requirements between these hosts are B(h1, h1_i), i=1 to n, then the probability with which a host h2 from among h1_1 to h1_n is selected is given by $$P(h1\_i)=B(h1,h1\_i)/\Sigma B(h1,h1\_i)$$

There may be latency requirements as well; certain hosts must be able to communicate with h1 with lower latency than the others. If there is such latency constraint given by L((h1, h1_i), i=1 to n, then the probability function may be adjusted with accommodate both bandwidth and latency as shown below.

$$P(h1\_i)=(B(h1,h1\_i)/\Sigma B(h1,h1\_i))\times(\Sigma L(h1,h1\_i)/L(h1,h1\_i))$$

One may use a weighted probabilistic function, in which bandwidth and latency will be given different weight values reflecting their importance in a given system.

Function f2 may be devised in a number of ways. A simple design may use the direct neighbor of h2 among all direct neighbors with uniform probability. Preference may be given to those neighbors with this h2 talks less frequently, to avoid moving a hosts with which h2 talks more frequently away from h2. This may be reflected with a probability function that uses the bandwidth and latency information of h2 and its neighboring hosts.

Function f3 may be devised in a number of ways. For example if the relocation reduces the cost function, then the relocation may always be accepted. On the other hand, if the relocation increases the cost, then the relocation may be accepted with certain probability function. The probability function may be devised based on the type of optimization. For example, in a simulated annealing based approach, the acceptance probability may depend upon a time-varying parameter called "temperature", which controls whether a relocation that increases the cost function is accepted or rejected. The algorithm begins iterating the inner loop at higher temperature and progressively reduces the temperature at each pass of the inner loop. At higher temperature levels, a relocation that increases the cost function is accepted with higher probability than at lower temperature levels, thus allowing higher chances of moving away from local minima at higher temperatures. As the system cools down, (i.e. temperature drops), movements that increase the cost function are accepted with lower probability. At the start of each outer iteration loop, the temperate may be restored at a higher level, thus creating multiple passes of the cooling process in the inner loop. The function f3 may be defined as:

$$P(relocation)=1/(1+\exp((cost(old)-cost(new))/cost(initial)\times temp))$$

Figure 7:
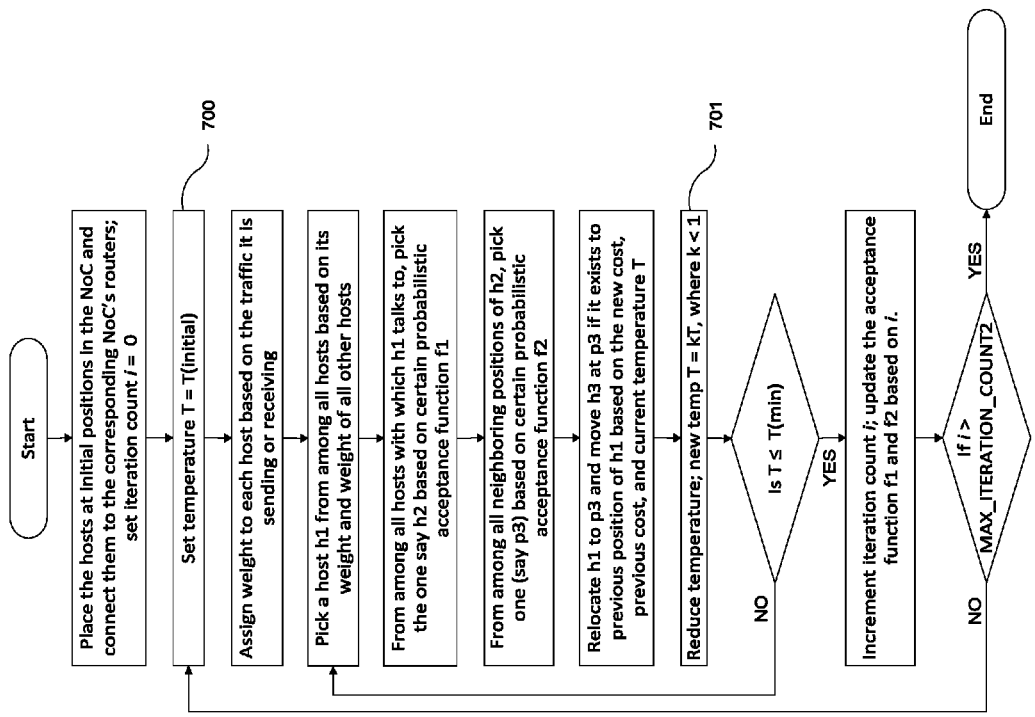
FIG. 7 illustrates how the above algorithm can be extended to implement a simulated annealing like algorithm for host position computation.

Here P(relocation) indicates the probability of whether the relocation is accepted or not. cost(old) is the cost function before relocation, and cost(new) is the cost function after relocation. cost(initial) is the initial system cost function, and temp is the current temperature level. Initial temperate level may be chosen at 1 or some other value, and reduced in a geometric progression after every fixed number of passes of the inner loop. Temperature may be reduced in some other manner as well. The inner loop may continue until the temperate reaches some pre-determined lowest allowed value T(min). This procedure is described in FIG. 7. Compared to the example shown in FIG. 6, this implementation initializes the temperature at step 700 at the beginning of each inner loop, and reduces it according to a geometric sequence at step 701. Once temperature reaches the minimum configured value the inner loop stops. Functions f1 and f2 may also be defined based on the current temperature level, inter-host communication bandwidth and latency specification, and the current position of various hosts.

A typical example implementation may use initial temperature T(initial) of 1 and final temperature T(min) of 0.001. During the i-th pass of the inner loop, the current temperature T may be updated according to the following equation: $T=T(initial)\times(0.9)^{(i/C)}$, where C is a system constant depending on the size of the network and number of hosts. $C=n^3$, where n is the total number of hosts has given good results in certain example implementations. When temperature T reaches the final value T(min) then the inner loop finishes.

Function f1, f2, and f3 may also be devised in a number of additional ways in various example implementations in order to emulate the behavior of standard optimization approaches such a genetic algorithm or machine learning.

Figure 8:
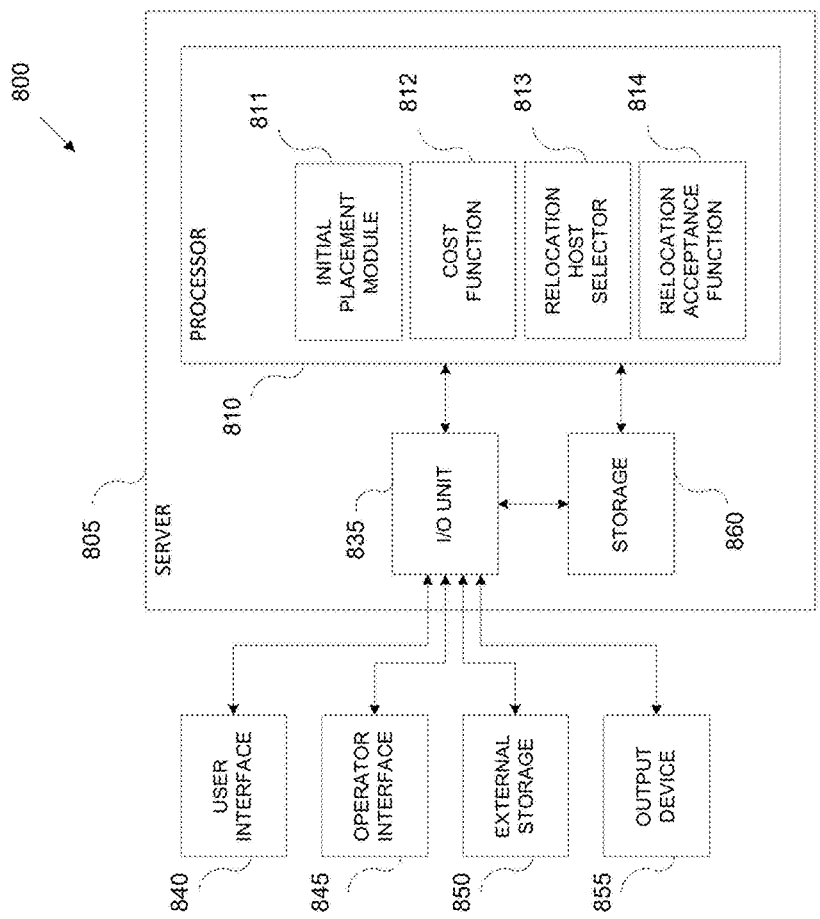
FIG. 8 illustrates a computer/server block diagram upon which the example implementations described herein may be implemented.

FIG. 8 illustrates an example computer system 800 on which example implementations may be implemented. The computer system 800 includes a server 805 which may involve an I/O unit 835, storage 860, and a processor 810 operable to execute one or more units as known to one of skill in the art. The term "computer-readable medium" as used herein refers to any medium that participates in providing instructions to processor 810 for execution, which may come in the form of computer-readable storage mediums, such as, but not limited to optical disks, magnetic disks, read-only memories, random access memories, solid state devices and drives, or any other types of tangible media suitable for storing electronic information, or computer-readable signal mediums, which can include transitory media such as carrier waves. The I/O unit processes input from user interfaces 840 and operator interfaces 845 which may utilize input devices such as a keyboard, mouse, touch device, or verbal command.

The server 805 may also be connected to an external storage 850, which can contain removable storage such as a portable hard drive, optical media (CD or DVD), disk media or any other medium from which a computer can read executable code. The server may also be connected an output device 855, such as a display to output data and other information to a user, as well as request additional information from a user. The connections from the server 805 to the user interface 840, the operator interface 845, the external storage 850, and the output device 855 may via wireless protocols, such as the 802.11 standards, Bluetooth® or cellular protocols, or via physical transmission media, such as cables or fiber optics. The output device 855 may therefore further act as an input device for interacting with a user.

The processor 810 may execute one or more modules. The initial placement module 811 may be configured to place the hosts at some initial positions in the 2D plane that avoids any host overlaps, and also ensures that the required connectivity is satisfied. The cost function module 812 devises a cost function based on the host positions in the NoC topology, routes taken by various transactions, the hosts inter-communication bandwidth and latency specification, and the desired performance metrics such as structural latency, interconnect area and power, etc. The relocation host selector module 813 may be configured to select various hosts that are examined for relocation to new positions, and the corresponding new positions. The relocation acceptance function module 814 decides whether a relocation decision from the relocation host selector module is accepted or rejected based on the feedback from the cost function module that determines the cost of the new host positions. The relocation host selector module 813 and relocation acceptance function module 814 may be implemented based on the example implementations as described above in, for example, FIGS. 5-7.

Furthermore, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example implementations, the steps carried out require physical manipulations of tangible quantities for achieving a tangible result.

Moreover, other implementations of the present application will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

What is claimed is:

1. A method for determining host positions for a Network-on-Chip (NoC) topology, comprising:
utilizing a processor to:
select, from a plurality of hosts of the NoC topology, a first host based on a weight assigned to the first host;
select a location from a plurality of locations that neighbors a second host from the plurality of hosts of the NoC topology, the second host determined from at least one probability assigned to at least one of the plurality of hosts from a first probabilistic acceptance function, based on at least one probability assigned to at least one of the plurality of locations that neighbors the second host from a second probabilistic acceptance function; and
move the first host to the location for a relocation decision based on a third probabilistic acceptance function that is a result indicative of accepting the moving of the first host.

2. The method of claim 1, further comprising:
iteratively repeating the method for determining host positions until a max iteration count is reached, and
updating the first probabilistic acceptance function and the second probabilistic acceptance function based on at least one of: inter-host communication bandwidth, the NoC topology, and one or more latency constraints.

3. The method of claim 1, further comprising:
iteratively repeating the method for determining host positions until a temperature of the NoC topology reaches a minimum temperature threshold, and
updating the first probabilistic acceptance function and the second probabilistic acceptance function based on at least one of: the temperature of the NoC topology, inter-host communication bandwidth, the NoC topology, and one or more latency constraints.

4. The method of claim 1, wherein the first probabilistic acceptance function assigns the at least one probability to the at least one of the plurality of hosts based on at least one of: a frequency that the first host communicates with the at least one of the plurality of hosts, a latency constraint between the first host and the at least one of the plurality of hosts, and a bandwidth constraint between the first host and the at least one of the plurality of hosts.

5. The method of claim 1, wherein the second probabilistic acceptance function assigns the at least one probability to the at least one of the plurality of locations that neighbors the second host based on at least one of: a frequency that the second host communicates to the at least one of the plurality of locations that neighbors the second host, a latency constraint between the second host and the at least one of the plurality of locations that neighbors the second host, and a bandwidth constraint between the second host and the at least one of the plurality of locations that neighbors the second host.

6. The method of claim 1, wherein the first probabilistic acceptance function, the second probabilistic acceptance function, and the third probabilistic acceptance function are implemented based on at least one of: genetic optimization algorithm and machine learning.

7. The method of claim 1, wherein the third probabilistic acceptance function provides a probability for relocation based on at least one of: a reduction of a cost function and a temperature of the NoC topology.

8. A non-transitory computer readable storage medium storing instructions for causing a computer to determine host positions for a Network-on-Chip (NoC) topology, the instructions comprising:
selecting, from a plurality of hosts of the NoC topology, a first host based on a weight assigned to the first host;
selecting a location from a plurality of locations that neighbors a second host from the plurality of hosts of the NoC topology, the second host determined from at least one probability assigned to at least one of the plurality of hosts from a first probabilistic acceptance function, based on at least one probability assigned to at least one of the plurality of locations that neighbors the second host from a second probabilistic acceptance function; and moving the first host to the location for a relocation decision based on a third probabilistic acceptance function that is a result indicative of accepting the moving of the first host.

9. The non-transitory computer readable storage medium of claim 8, wherein the instructions further comprise:
iteratively repeating the instructions for determining host positions until a max iteration count is reached, and
updating the first probabilistic acceptance function and the second probabilistic acceptance function based on at least one of: inter-host communication bandwidth, the NoC topology, and one or more latency constraints.

10. The non-transitory computer readable storage medium of claim 8, wherein the instructions further comprise:
iteratively repeating the instructions for determining host positions until a temperature of the NoC topology reaches a minimum temperature threshold, and
updating the first probabilistic acceptance function and the second probabilistic acceptance function based on at least one of: the temperature of the NoC topology, inter-host communication bandwidth, the NoC topology, and one or more latency constraints.

11. The non-transitory computer readable storage medium of claim 8, wherein the first probabilistic acceptance function assigns the at least one probability to the at least one of the plurality of hosts based on at least one of: frequency that the first host communicates with the at least one of the plurality of hosts, a latency constraint between the first host and the at least one of the plurality of hosts, and a bandwidth constraint between the first host and the at least one of the plurality of hosts.

12. The non-transitory computer readable storage medium of claim 8, wherein the second probabilistic acceptance function assigns the at least one probability to the at least one of the plurality of locations that neighbors the second host based on at least one of: a frequency that the second host communicates to the at least one of the plurality of locations that neighbors the second host, a latency constraint between the second host and the at least one of the plurality of locations that neighbors the second host, and a bandwidth constraint between the second host and the at least one of the plurality of locations that neighbors the second host.

13. The non-transitory computer readable storage medium of claim 8, wherein the first probabilistic acceptance function, the second probabilistic acceptance function, and the third probabilistic acceptance function are implemented based on at least one of: genetic optimization algorithm and machine learning.

14. The non-transitory computer readable storage medium of claim 8, wherein the third probabilistic acceptance function provides a probability for relocation based on at least one of: a reduction of a cost function and a temperature of the NoC topology.

15. A system, comprising:
a relocation host selector module to determine host positions for a Network-on-Chip (NoC) topology, and configured to:
select, from a plurality of hosts of the NoC topology, a first host based on a weight assigned to the first host;
select a location from a plurality of locations that neighbors a second host from the plurality of hosts of the NoC topology, the second host determined from at least one probability assigned to at least one of the plurality of hosts from a first probabilistic acceptance function, based on at least one probability assigned to at least one of the plurality of locations that neighbors the second host from a second probabilistic acceptance function; and
move the first host from one location another location for a relocation decision that is a result indicative of accepting the moving of the first host; and
a relocation acceptance function module configured to determine the relocation decision based on a third probabilistic acceptance function.

16. The system of claim 15, wherein the relocation host selector module is further configured to:
iteratively determine host positions until a max iteration count is reached, and
update the first probabilistic acceptance function and the second probabilistic acceptance function based on at least one of: inter-host communication bandwidth, the NoC topology, and one or more latency constraints.

17. The system of claim 15, wherein the relocation host selector module is further configured to:
iteratively determine host positions until a temperature of the NoC topology reaches a minimum temperature threshold, and
update the first probabilistic acceptance function and the second probabilistic acceptance function based on at least one of: the temperature of the NoC topology, inter-host communication bandwidth, the NoC topology, and one or more latency constraints.

18. The system of claim 15, wherein the first probabilistic acceptance function assigns the at least one probability to the at least one of the plurality of hosts based on at least one of: frequency that the first host communicates with the at least one of the plurality of hosts, a latency constraint between the first host and the at least one of the plurality of hosts, and a bandwidth constraint between the first host and the at least one of the plurality of hosts.

19. The system of claim 15, wherein the second probabilistic acceptance function assigns the at least one probability to the at least one of the plurality of locations that neighbors the second host based on at least one of: a frequency that the second host communicates to the at least one of the plurality of locations that neighbors the second host, a latency constraint between the second host and the at least one of the plurality of locations that neighbors the second host, and a bandwidth constraint between the second host and the at least one of the plurality of locations that neighbors the second host.

20. The system of claim 15, wherein the first probabilistic acceptance function, the second probabilistic acceptance function, and the third probabilistic acceptance function are implemented based on at least one of: genetic optimization algorithm and machine learning.

21. The system of claim 15, wherein the third probabilistic acceptance function provides a probability for relocation based on at least one of: a reduction of a cost function and a temperature of the NoC topology.

* * * * *